Figure 1:
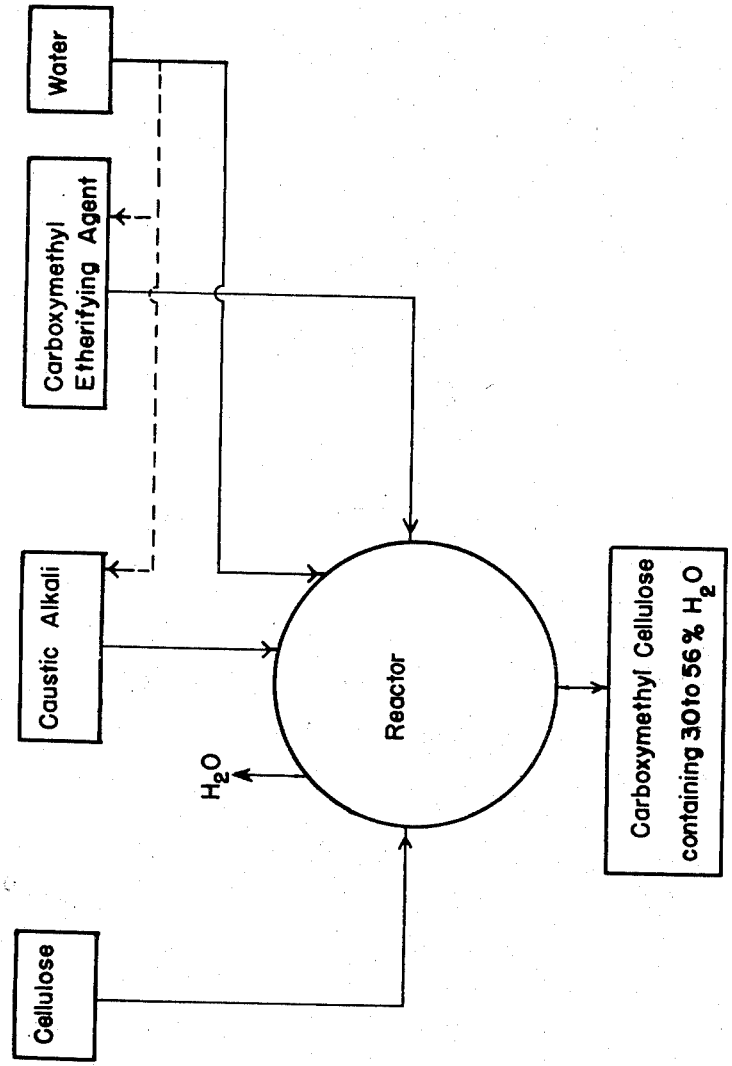

Feb. 20, 1951 F. W. SMITH 2,542,215
METHOD OF MAKING CARBOXYMETHYLCELLULOSE
OF IMPROVED SOIL SUSPENDING PROPERTIES
Filed July 30, 1949 2 Sheets-Sheet 1

INVENTOR.
Frederick W. Smith
BY Attorney *William R. Day*

Patented Feb. 20, 1951

2,542,215

UNITED STATES PATENT OFFICE 2,542,215

METHOD OF MAKING CARBOXYMETHYL-CELLULOSE OF IMPROVED SOIL SUSPENDING PROPERTIES

Frederick W. Smith, Allen Park, Mich., assignor to Wyandotte Chemicals Corporation, Wyandotte, Mich., a corporation of Michigan Application July 30, 1949, Serial No. 107,768

7 Claims. (Cl. 260—231)

OBSERVATION AND PROBLEM

Carboxymethylcellulose, most usually available in its commercial form as sodium carboxymethylcellulose[1], and alternatively called sodium cellulose glycollate, has been known as a beneficial additive for enhancing the washing and detergent properties of washing solutions. It has been indicated (see address on "Tailoring Synthetic Detergents" by J. C. Harris, annual convention of the American Soap and Glycerine Producers, January 1949) that Na CMC imparts a colloidal or soil suspending property to aqueous washing media, which property is highly desirable in non-soap solutions. It has been observed, however, that when Na CMC is so used, and particularly when used as an additive for alkaline washing solutions as customarily employed in the laundering of textile fabrics, it has produced most erratic and non-uniform results. Not only has there occurred a wide range of variations in the soil suspending properties of Na CMC derived from different synthesizing processes, but in different lots or runs of Na CMC derived from one and the same synthesizing process. The cause of this variation has up to now escaped analysis.

SUMMARY OF INVENTION

I have discovered that the above stated problem is first of all, due to variation in the amount of water or moisture present during the Na CMC synthesizing process; and that such variation can be eliminated by controlling the amount of moisture present within certain well-defined, critical limits.

Specifically a critical moisture content of 30–56% by weight (total weight basis) and preferably an optimum range of 34–47% within such critical range, produces a Na CMC product having a uniformly high (33% or better "whiteness retention") soil suspending value.

The ingredients employed in the synthesis of Na CMC are cellulose, caustic alkali (usually NaOH), a carboxymethyletherifying agent (CH$_2$ClCOOH or CH$_2$ClCOONa)

and water. This is true whether the synthesizing process be of the type wherein sheet cellulose is steeped and shredded, or merely shredded, (Ger. Pat. No. 332,203 and U. S. Pat. No. 2,131,733, respectively); or a process wherein a continuous cellulose sheet is dipped, roll pressed, and shredded (U. S. Pat. No. 2,313,866); or a process wherein powdered cellulose (finer than 40 mesh, majority through 100 mesh and a bulk or "struck" density of 5–17 lbs./cu. ft.) is tumbled during the spraying-on of liquid reactants (co-pending U. S. patent application Serial No. 787,243 filed November 20, 1947, now Patent No. 2,510,355, by William F. Waldeck). The water may be present as an added ingredient per se, or in combination, with one or more of the ingredients (as a solvent for the NaOH, CH$_2$ClCOOH or CH$_2$ClCOONa), or it may be formed during the reaction as a by-product (i. e., by reaction of the NaOH with the cellulose or with the chloroacetic acid). Probably the most accurate and reliable way of measuring the amount of moisture present during the reaction is to determine the moisture content of the Na CMC product as it is immediately discharged from the reaction vessel. Hence, the above specified critical range moisture content of 30–56% is given on that basis.

Figure 2:
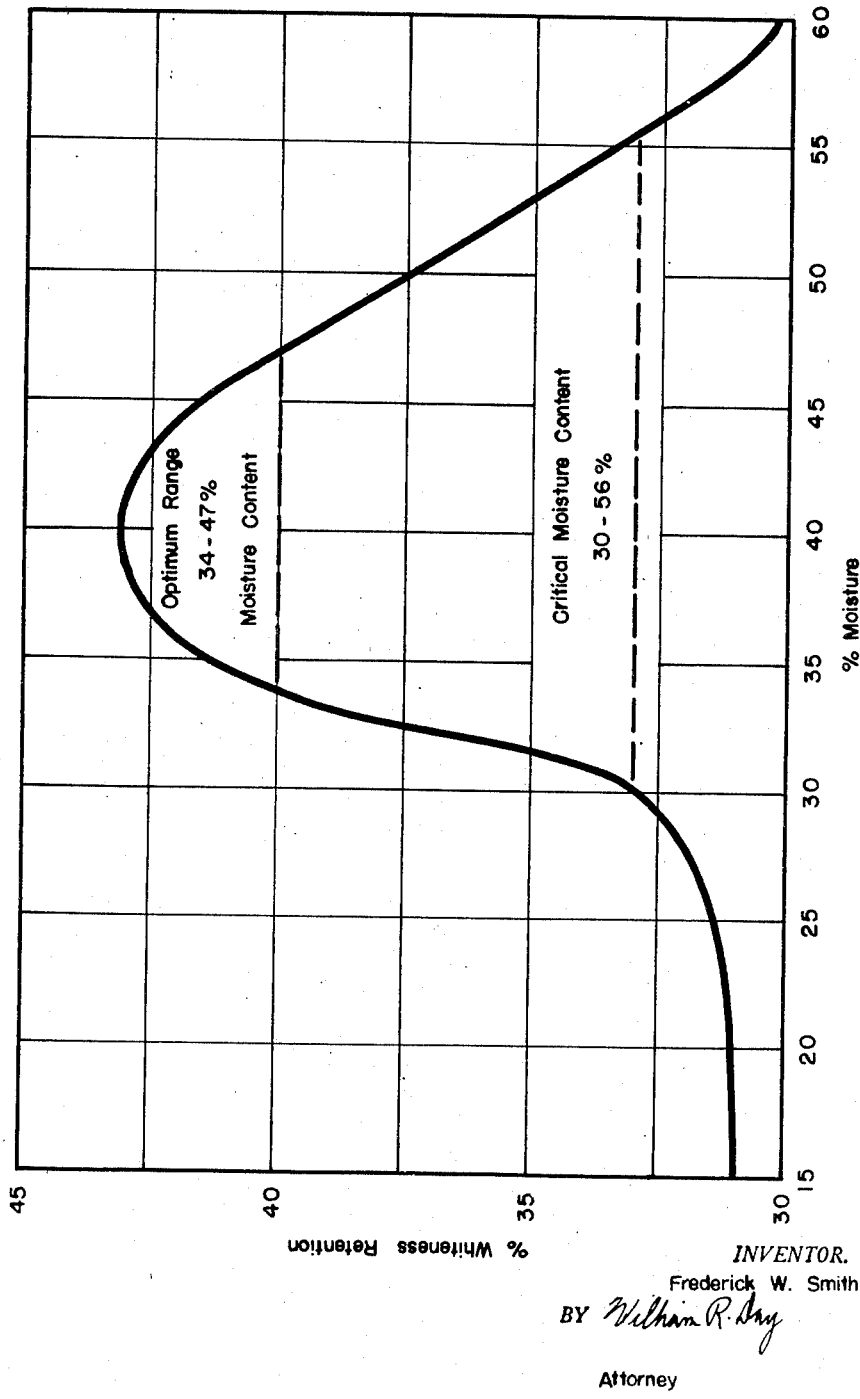

In the attached drawings, Fig. 1 is a flow sheet illustrative of the above described aspects of my invention; and Fig. 2 is a graph wherein the soil suspending properties of test washing solutions, denoted "whiteness retention" are plotted against the per cent of moisture present during the Na CMC synthesizing reaction, and showing the unusual critical nature of the latter.

Referring more particularly to Fig. 1, it will be seen that the starting materials or ingredients for the process shown therein are cellulose, NaOH, carboxymethyl-etherifying agent and water. These ingredients are shown as being introduced into a reactor where the combined reactions of mercerizing the cellulose and etherification are carried out. Also, as shown by the dotted lines in Fig. 1, a portion or all of the water ingredient may be combined with one or more of the otherwise solid ingredients. Normally the cellulose, whether in the form of sheet cellulose or powdered cellulose, contains a maximum of about 5% by weight of moisture. It is also usually most convenient to handle the NaOH and the CH$_2$ClCOOH or CH$_2$ClCOONa in the form of their aqueous

[1] For convenience, "sodium carboxymethylcellulose" will hereinafter be referred to as "Na CMC."

solutions, particularly where the latter are to be introduced in the process in the form of sprayed-on reactants such as in the process of the aforesaid application Serial No. 787,243; as well as in other types of processes wherein sheet cellulose is steeped or dipped in NaOH solution and then reacted with chloroacetate etherifying agent accompanied with strenuous mechanical disruption, such as in a shredding machine or ball mill.

It will be seen from Fig. 1 that the objective of the process is to obtain a Na CMC product containing 30–56% and preferably 34–47% H₂O at the point where it issues from the reactor. By simple calculation of the proportion of water which is introduced either separately or in conjunction with the other ingredients, or both, it is possible thereby to control the desired critical proportion of moisture content in the final product. In other words, the theoretical amount of water which should be present during the reaction is calculable from the amounts of introduced reactants. The loss of water, such as by evaporation during reaction will remain constant where uniform operative conditions of temperature, time, concentration and agitation are maintained. Thus by control of such theoretical amount of water introduced into the reaction, and regulation of the amount of evaporation, the actual water or moisture content present in the Na CMC product as it issues or emerges from the reaction can be controlled and maintained within the prescribed critical limits, thereby obtaining a product having constantly and uniformly high soil suspending properties.

Establishment of the critical range proportions of moisture content of the Na CMC product of my invention is supported by the following described examples.

EXAMPLE 1

Powdered cellulose ("Solka Floc BW-100") having a particle size of finer than 40 mesh, approximately over 89% being finer than 100 mesh, and a bulk density of approximately 16 lbs./cu. ft., in the amount of 500 grams, was charged into a dough mixer to which there was added 546 grams of 45% concentration solution of NaOH. The cellulose and NaOH solution were then mixed for one hour at a temperature of 26–27° C. Thereupon 356 grams of a 78% concentration monochloroacetic acid solution was added to the mixture and the mixing continued for an additional two hours. At the time of initial addition of the monochloroacetic acid the temperature was 30° C. and during the mixing period it was 25–26.5° C. This corresponded to an amount of carboxymethyl-etherifying agent sufficient to produce theoretically one degree of substitution (hereinafter termed "D. S.") of glycollic acid residue per glucose unit of cellulose. The theoretically calculated amount of water present, including water of reaction, was 39%. Substantial evaporation of water was prevented by keeping the cover on the dough mixer, and holding the temperature at 25–30° C. by means of circulating cooling water in the jacket on the mixer. The Na CMC product was then taken out of the dough mixer and upon analysis found to contain 35.2% by weight of moisture content.

On subjecting this Na CMC product to the following described "Whiteness retention test" procedure to determine its soil suspending properties, it was found to have a whiteness retention value of 41.7%.

Whiteness retention test procedure

Bleached, unfinished, clean Indian Head muslin, count 58 x 47, weight 4.7 oz./sq. yd. (Nashua Manufacturing Company) is cut into swatches measuring 2½" x 3½". The light reflectance of each side of every swatch is measured by means of a Hunter multipurpose reflectometer equipped with a green filter, using a standard white backing with a reflectance of 68.8% behind the cloth swatch. The average of such values of each side of each test piece is calculated and recorded. A standard soil suspension is prepared by diluting 28.55 grams of an aqueous carbon dispersion ("Aqua Blak B", Binney and Smith Co.) to 1 liter in a volumetric flask of distilled water. A 0.15% washing solution is then prepared according to the following formulation:

| | Parts |
|---|---|
| Standard soap | 2 |
| Alkaline builder | 1 |

Alkaline builder consisting of:
  Caustic soda, 30% (by weight)
  Sodium carbonate, 66% (by weight)
  Sodium CMC, 4% (by weight)

In the tests herein described, the wet sodium carboxymethylcellulose product of varying degrees of moisture content is first dried (such as by drying in an oven at 50–60° C. overnight) to reduce all test samples to the substantially anhydrous basis.

The standard soil suspension is next shaken vigorously and the 50 ml. quantity pipetted into 1 liter of the 0.15% detergent solution. The resultant mixture is placed in 100 ml. portions into each of 5 Launder-Ometer jars, each jar containing fifteen ¼" stainless steel balls. The jars and contents are brought to a temperature of 140°±2° F. in a constant water bath, then placed in the Launder-Ometer and rotated for 5 minutes at 42±2 R. P. M. The Launder-Ometer is thereafter stopped and without removing the jars from the machine, the lids are opened and two standard cloth swatches, prepared as previously described, are placed in each jar after soaking for exactly 1 minute in distilled water without subsequent draining. The lids are replaced on the jars and the latter are rotated for an additional 30 minutes in the Launder-Ometer. The swatches are then removed and immediately rinsed by flowing 3 liters of distilled water continuously through a rinsing flask while shaking, and for a period of 5 minutes. Immediately after rinsing, the swatches are removed from the rinsing flask and placed on flat clean paper towels. The swatches are pressed dry on a laundry press set at a temperature of 328°–338° F. After pressing, the reflectance of both sides of each swatch is again measured by the Hunter reflectometer and the average reflectance of all swatches calculated and recorded. The whiteness retention value is then calculated as follows:

Per cent whiteness retention (W. R.) =
$$\frac{\text{Ave. reflectance after soiling} \times 100}{\text{Ave. reflectance before soiling}}$$

EXAMPLES 2–11

The same powdered cellulose starting material as employed in Example 1, together with solutions of NaOH and 78% monochloroacetic acid, were then similarly reacted. Varying amounts of water, however, were added to produce different moisture conditions during reaction. In each case the amount of chloroacetic acid, anhydrous basis, corresponded to that theoretically required to produce 1.0 D. S. on the basis of anhydrous cellulose present. The actual moisture content of the Na CMC at the end of the reaction, together with the resultant whiteness retention values of the so-prepared products are tabulated as follows:

| Example | Per Cent Moisture Content | Per Cent Whiteness Retention |
|---|---|---|
| 2 | 24.0 | 31.2 |
| 3 | 30.2 | 33.1 |
| 4 | 33.5 | 39.7 |
| 5 | 34.5 | 40.0 |
| 6 | 40.4 | 43.2 |
| 7 | 43.6 | 42.3 |
| 8 | 44.3 | 41.0 |
| 9 | 47.9 | 39.4 |
| 10 | 52.6 | 35.3 |
| 11 | 58.2 | 30.9 |

The foregoing values of moisure content and per cent of whiteness retention for Examples 1-11 are graphically illustrated in Fig. 2. By observation of the curve shown therein, it will be seen that within the range of 30–55% moisture that the whiteness retention value or soil suspending property of the Na CMC rises (i. e., above the 32% whiteness retention ordinate) most remarkably above the surrounding plateau established by the whiteness retention values for moisture contents on both sides of this critical range.

The principle of my invention is not dependent upon the particular type of Na CMC synthesizing process employed. In support of this statement, the following examples are cited:

EXAMPLE 12

This examples illustrates the principle of my invention as applied to the type of Na CMC manufacturing process wherein sheet cellulose is used as a starting material.

Cellulose in sheet form (St. Regis Paper Co.) in the amount of 500 grams was placed in a shredding machine and 712 grams of 35% NaOH solution added thereto in a period of one-half hour. The cellulose and NaOH solution were then worked in the shredder for one hour. Thereupon 355 grams of a 78% monochloroacetic acid solution were added over the course of 1 hour and the shredding action continued for another 2 hours. Thereupon the Na CMC product was discharged from the shredding machine, and upon analysis found to have a moisture content of 37.6%. The whiteness retention value of this product, after drying and testing, was found to be 41.4%. By referring to the chart in Fig. 2, it will be seen that the point representative of the Na CMC product in this example falls squarely within the critical zone demarked by the curve.

EXAMPLE 13

In order to demonstrate the confirmation of the principle of my invention as applied to the sheet cellulose type of synthesis of Na CMC, another run similar to that of Example 12 above, was made employing the same kind of sheet cellulose, but with a stronger concentration of NaOH solution (498 grams of 50% NaOH); or alternatively by adjusting the water ingredient present during the reaction to a lesser amount corresponding to a point beyond the critical range upon which the operability of my invention is dependent. The moisture content of the so-prepared Na CMC product when discharged from the reaction process was found to be 18.9%. After drying and subjecting to the whiteness retention tests, the value of only 31.2% whiteness retention was obtained.

Thus, it will be seen that the point on the graph of Fig. 2, representative of the product of this example, falls clearly without the critical zone demarked therein.

Other modes of applying the principle of my attention, in addition to the one hereinabove described and illustrated in detail, may be employed, provided the elements stated by any of the following claims or the equivalent of such elements be utilized.

I, therefore, particularly point out and distinctly claim as my invention and discovery:

1. In the process of making sodium carboxymethylcellulose from the reaction of powdered cellulose of finer than 40 mesh particle size, approximately 89% thereof being finer than 100 mesh, and of 16 lbs./cu. ft. bulk density, with aqueous solutions of NaOH and chloroacetic acid, wherein the powdered cellulose is subjected to a tumbling action while said aqueous solutions are sprayed thereon, the improvement which comprises adjusting the concentrations of such solutions at the start of the reaction, and controlling the amount of evaporation during reaction, as to produce 30–56% by weight of water in the product at the finish of the reaction.

2. In the process of making sodium carboxymethylcellulose from the reaction of powdered cellulose of finer than 40 mesh particle size, approximately 89% thereof being finer than 100 mesh, and of 16 lbs./cu. ft. bulk density, with aqueous solutions of NaOH and chloroacetic acid, wherein the powdered cellulose is subjected to a tumbling action while said aqueous solutions are sprayed thereon, the improvement which comprises adjusting the concentrations of such solutions at the start of the reaction, and controlling the amount of evaporation during reaction, as to produce 34–47% by weight of water in the product at the finish of the reaction.

3. The process as in claim 1 wherein the amount of chloroacetic acid present, on the anhydrous basis, corresponds to that theoretically required to produce one degree of substitution of glycollic acid residue per glucose unit of cellulose present.

4. In the process of making sodium carboxymethylcellulose from the reaction of powdered cellulose of finer than 40 mesh particle size, approximately 89% thereof being finer than 100 mesh, and of a 16 lbs./cu. ft. bulk density, the improvement which comprises reacting said cellulose with a 45% NaOH solution and a 78% chloroacetic acid solution, tumbling the powdered cellulose while spraying the NaOH and chloroacetic acid solution thereon so that such reactants are mixed for approximately 2 hours, and preventing substantial evaporation during such reaction period, as to produce a sodium carboxymethylcellulose containing approximately 35% by weight of water at the finish of the reaction.

5. In the process of making carboxymethylcellulose from the reaction of comminuted cellulose having a particle size finer than 40 mesh screen size, the major portion being capable of passing through a 100 mesh screen, and having a bulk density of at least 5 pounds per cubic foot, with aqueous solutions of NaOH and sodium chloracetate formed in situ from chloracetic acid and sodium carbonate, wherein the comminuted cellulose is subjected to a tumbling action while an aqueous solution of NaOH is sprayed thereon, the improvement which comprises adjusting the concentrations of such solutions at the start of the reaction, and controlling the amount of evaporation during reaction in order to produce a product containing 30 to 56% by weight of water at the finish of the reaction.

6. In the process of making carboxymethylcellulose from the reaction of comminuted cellulose having a particle size finer than 40 mesh screen size, the major portion being capable of passing through a 100 mesh screen, and having a bulk density of at least 5 pounds per cubic foot, with aqueous solutions of NaOH and sodium chloracetate formed in situ from chloracetic acid and sodium carbonate, wherein the comminuted cellulose is subjected to a tumbling action while an aqueous solution of NaOH is sprayed thereon, the improvement which comprises adjusting the concentrations of such solutions at the start of the reaction, and controlling the amount of evaporation during reaction in order to produce a product containing 34 to 47% by weight of water at the finish of the reaction.

7. In the process of making carboxymethylcellulose by reacting cellulose with caustic alkali and an etherifying agent containing the chloracetate radical, which process includes the step of subjecting to a mechanical mixing action, in the presence of caustic alkali and etherifying agent, a mass of comminuted cellulose having a particle size capable of passing through a 40 mesh screen and the majority of which is finer than 100 mesh screen size, said comminuted cellulose having a bulk density of at least 5 pounds per cubic foot; such mechanical mixing action being in the form of a combined agitation and tumbling of the cellulose mass, whereby the individual, discrete particles of cellulose are wetted by the liquid caustic alkali and etherifying reactants, the improvement which comprises adjusting the concentrations of the solutions of caustic alkali and etherifying agent at the start of the reaction, and controlling the amount of evaporation during the reaction in order to produce a product containing from 30 to 56% by weight of water at the finish of the reaction.

FREDERICK W. SMITH.

REFERENCES CITED

The following references are of record in the file of this patent:

UNITED STATES PATENTS

| Number | Name | Date |
|---|---|---|
| 2,131,733 | Haskins et al. | Oct. 4, 1938 |
| 2,278,612 | Collings et al. | Apr. 7, 1942 |
| 2,313,866 | Finlayson | Mar. 16, 1943 |
| 2,476,331 | Swinehart | July 19, 1949 |
| 2,482,844 | Finlayson | Sept. 27, 1949 |

FOREIGN PATENTS

| Number | Country | Date |
|---|---|---|
| 572,868 | Great Britain | of 1945 |